United States Patent
Kim et al.

(10) Patent No.: US 8,147,716 B2
(45) Date of Patent: Apr. 3, 2012

(54) RED PHOSPHOR AND PLASMA DISPLAY PANEL INCLUDING SAME

(75) Inventors: Young-Ki Kim, Yongin-si (KR); Ick-Kyu Choi, Yongin-si (KR); Jay-Hyok Song, Yongin-si (KR); Yu-Mi Song, Yongin-si (KR); Young-Hun Lee, Yongin-si (KR); Min-kyu Kim, Yongin-si (KR); Soon-Rewl Lee, Yongin-si (KR); Yoon-Chang Kim, Yongin-si (KR); Dong-Sik Zang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/960,383

(22) Filed: Dec. 3, 2010

(65) Prior Publication Data

US 2012/0032114 A1   Feb. 9, 2012

(30) Foreign Application Priority Data

Aug. 3, 2010   (KR) .................. 10-2010-0075075

(51) Int. Cl.
*C09K 11/02* (2006.01)
*H01J 29/10* (2006.01)
(52) U.S. Cl. .................. 252/301.4 R; 313/468
(58) Field of Classification Search ........... 252/301.4 R; 313/467, 468, 483, 510
See application file for complete search history.

(56) References Cited

U.S. PATENT DOCUMENTS

| 6,252,254 B1 | 6/2001 | Soules et al. |
| 2007/0096057 A1 * | 5/2007 | Hampden-Smith et al. ............... 252/301.16 |
| 2009/0020897 A1 * | 1/2009 | Winkler et al. ............... 264/1.22 |
| 2010/0127214 A1 * | 5/2010 | Seo et al. ............... 252/301.6 R |

FOREIGN PATENT DOCUMENTS

| GB | 1110290 A | * | 4/1968 |
| JP | 2000144130 A | * | 5/2000 |
| JP | 2004182907 A | * | 7/2004 |
| JP | 2005350534 A | * | 12/2005 |
| KR | 10-2001-0103846 A | | 11/2001 |
| KR | 10-2005-0049865 A | | 5/2005 |
| KR | 10-2006-0131524 A | | 12/2006 |
| KR | 10-2008-0076572 A | | 8/2008 |
| KR | 10-2009-0026308 A | | 3/2009 |

OTHER PUBLICATIONS

Wu et al. "Sol-gel synthesis and photoluminescence of K2NiF4-type structure phosphors CaxSr1-xGdyY1-yAlO4:zEu3+ with hybrid precursors", Nov. 11, 2006, Journal of Alloys and Compounds 441 (2007) pp. 214-218.*

* cited by examiner

*Primary Examiner* — Jerry Lorengo
*Assistant Examiner* — Lynne Edmondson
(74) *Attorney, Agent, or Firm* — Christie, Parker & Hale, LLP

(57) ABSTRACT

A red phosphor includes yttrium (Y), gadolinium (Gd), an alkaline-earth metal element, and europium (Eu). A plasma display panel (PDP) includes the red phosphor.

6 Claims, 4 Drawing Sheets

RED PHOSPHOR AND PLASMA DISPLAY PANEL INCLUDING SAME

RELATED APPLICATIONS

This application claims priority to and the benefit of Korean Patent Application No. 10-2010-0075075 filed in the Korean Intellectual Property Office on Aug. 3, 2010, the entire contents of which are incorporated herein by reference.

BACKGROUND

1. Field

This disclosure relates to a red phosphor and a plasma display panel (PDP) including the red phosphor.

2. Description of the Related Art

Phosphors are materials that receive energy such as light or electrons from the exterior and emit light (from the visible light wavelength range) that is perceivable by the human eye. Phosphors may be used for such electronic devices as plasma display panels (PDP), field emission displays (FED), and light emitting diodes (LED), and they may dominate the light emission characteristics and color characteristics of the electronic devices.

A PDP is a display device that displays an image by exciting phosphors with vacuum ultraviolet (VUV) rays generated by gas discharge in discharge cells.

A phosphor layer of the PDP includes red, green, and blue phosphors. Such phosphors should exhibit satisfactory light emitting brightness, decay time characteristics, and lifetime.

SUMMARY

In exemplary embodiments, a red phosphor has improved light emitting brightness and lifetime characteristics.

According to another embodiment, a PDP includes the red phosphor.

According to embodiments, a red phosphor includes yttrium (Y), gadolinium (Gd), an alkaline-earth metal element, and europium (Eu).

According to another embodiment, a plasma display panel (PDP) includes a red phosphor that includes yttrium (Y), gadolinium (Gd), an alkaline-earth metal element, and europium (Eu).

The red phosphor may be represented by the following Chemical Formula 1.

  Chemical Formula 1

In Chemical Formula 1, M is an alkaline-earth metal element, $0<x+y+z<2$, and $0 \leq y \leq 1$.

In some embodiments, for example, in Chemical Formula 1, x may be in the range of $0.01 \leq x \leq 1.4$, y may be in the range of $0.01 \leq y \leq 0.1$, and z may be in the range of $0.05 \leq z \leq 0.1$.

The alkaline-earth metal element may include Ca, Sr, Ba, or a combination thereof.

The alkaline-earth metal element may be present as a dopant for the red phosphor.

The alkaline-earth metal element may be distributed on the surface of the red phosphor.

DETAILED DESCRIPTION

Figure 1:
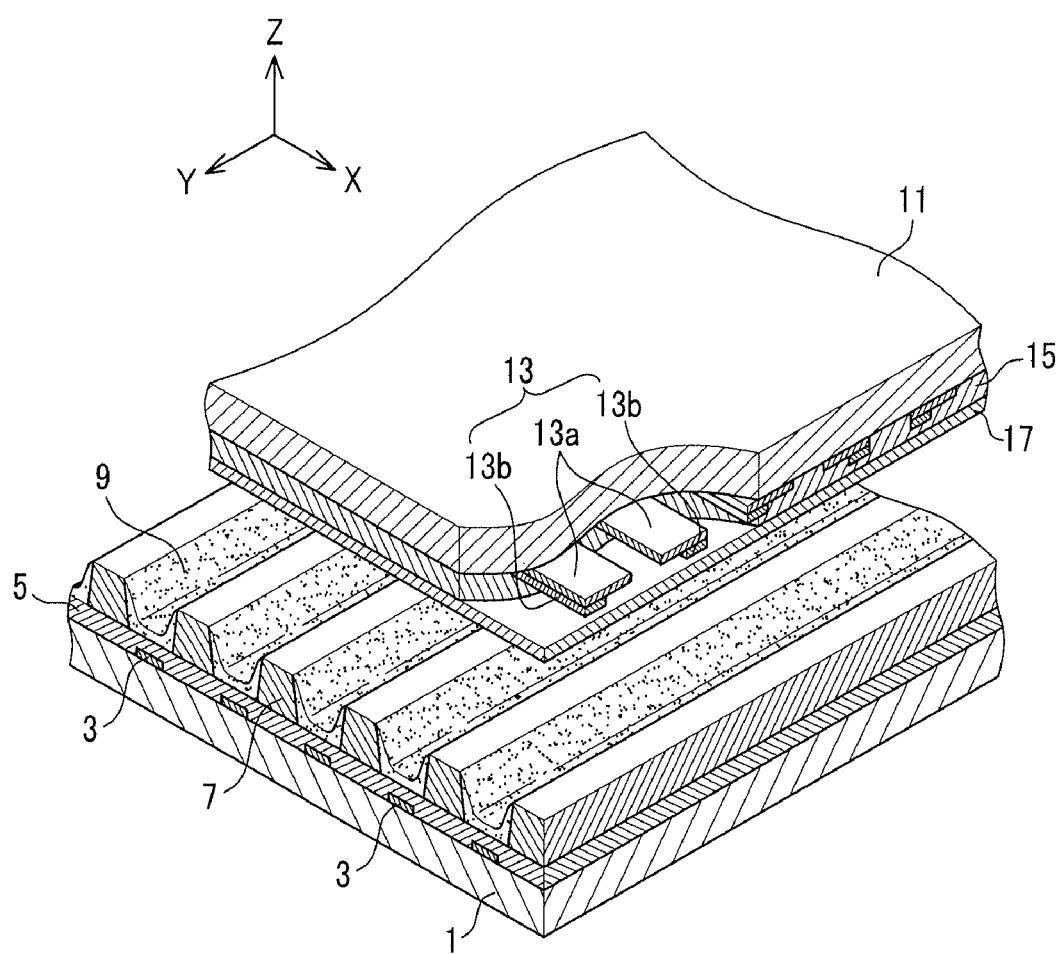
FIG. 1 is a partial, exploded perspective view of a PDP according to one embodiment.

Exemplary embodiments of the present invention will now be described with reference to the accompanying drawings. However, these embodiments are only exemplary, and the present invention is not limited thereto.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it may be directly on the other element or intervening elements may also be present. In contrast, when an element is referred to as being "directly on" another element, there are no intervening elements present.

The red phosphor according to one embodiment of the present invention includes yttrium (Y), gadolinium (Gd), an alkaline-earth metal element, and europium (Eu).

The alkaline-earth metal element may be selected from calcium (Ca), strontium (Sr), barium (Ba), or a combination thereof.

The alkaline-earth metal element may be uniformly distributed all over the red phosphor, or may be partially distributed.

When the alkaline-earth metal element is included in a red phosphor including yttrium (Y), gadolinium (Gd), and europium (Eu) as a dopant, the alkaline-earth metal element may be uniformly distributed all over the red phosphor.

When the alkaline-earth metal element is coated on the surface of a red phosphor that includes yttrium (Y), gadolinium (Gd), and europium (Eu), the alkaline-earth metal element may be partially distributed on the surface of the red phosphor.

The red phosphor may be represented by the following Chemical Formula 1.

  Chemical Formula 1

Chemical Formula 1, M is an alkaline-earth metal element, $0<x+y+z<2$, and $0<y<1$.

In some embodiments, x may be in the range of about $0.01 \leq x \leq$ about 1.4, y may be in the range of about $0.01 \leq y \leq$ about 0.1, and z may be in the range of about $0.05 \leq z \leq$ about 0.1.

In the red phosphor, part of the yttrium (Y) is substituted with the gadolinium (Gd) and alkaline-earth metal element (M), and europium (Eu) serves as an activator.

The red phosphor may have improved lifetime characteristics and lower discharge voltages thereby improving the light emitting brightness and preventing degradation of the phosphor by radiating VUV rays or ion impacting.

The red phosphor may be synthesized by a solid-phase reaction method at about 1200° C. or higher (for example, at about 1200 to about 1500° C.) under an oxidation atmosphere. The red phosphor may be prepared by mixing yttrium (Y), gadolinium (Gd), europium (Eu), and an alkaline-earth metal element followed by heat-treating. Alternatively, the red phosphor may be prepared by mixing yttrium (Y), gadolinium (Gd), and europium (Eu) and coating an alkaline-earth metal element on the mixture followed by heat-treating.

A plasma display panel (PDP) including the red phosphor will now be described with reference to the drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 is a partial, exploded perspective view of a PDP according to one embodiment. Referring to FIG. 1, the PDP includes a first substrate 1 and a second substrate 11 that are disposed substantially parallel to each other and spaced apart from each other by a distance.

On the surface of the first substrate 1, a plurality of address electrodes 3 are disposed in one direction (the Y direction in the drawing), and a first dielectric layer 5 is disposed covering the address electrodes 3. A plurality of barrier ribs 7 are formed on the first dielectric layer 5 between the address electrodes 3, and the barrier ribs have a height sufficient to form a plurality of discharge spaces.

The barrier ribs 7 may take any shape, as long as their shape enables partitioning of the discharge spaces. In addition, the barrier ribs 7 may have diverse patterns. For example, the barrier ribs 7 may have an open shape such as stripes, or as a closed shape such as a waffle, a matrix, or a delta shape. Also, the closed shaped barrier ribs may be formed such that a horizontal cross-section of the discharge space is a polygon such as a quadrangle, a triangle, or a pentagon, or a circle or an oval.

Then, red (R), green (G), and blue (B) phosphor layers 9 are disposed in red (R), green (G), and blue (B) discharge cells formed between the barrier ribs 7. The red phosphor layer includes the above red phosphor.

Display electrodes 13 (each including an electrode pair including a transparent electrode 13a and a bus electrode 13b) are disposed on the surface of the second substrate 11 facing the first substrate 1 in a direction substantially perpendicular to the address electrodes 3 (the X direction in the drawing). Also, a dielectric layer 15 is disposed on the surface of the second substrate 11 covering the display electrodes 13. The dielectric layer 15 is covered with a protection layer 17. The protection layer generally includes MgO.

Discharge cells are formed at the positions where the address electrodes 3 and the display electrodes 13 intersect.

The plasma display panel is driven by performing address discharge by applying an address voltage (Va) to the space between the address electrodes 3 and the display electrode 13, and performing sustain discharge by applying a sustain voltage (Vs) to the space between a pair of discharge sustain electrodes 13. An excitation source excites a corresponding phosphor layer 9 to thereby emit visible light through the transparent second substrate 11 so that a display is shown. A representative example of the excitation source is vacuum ultraviolet rays (VUV).

The following examples are provided for illustrative purposes only, and do not limit the scope of the invention.

Examples 1 to 5

Yttrium oxide ($Y_2O_3$), gadolinium oxide ($Gd_2O_3$), calcium carbonate ($CaCO_3$), and europium oxide ($Eu_2O_3$) were mixed according to chemical equivalent ratios, and mixed with 0.5 wt % of $AlF_3$ as a flux and baked at about 1400° C. in a reduction atmosphere for 2 hours 30 minutes. Subsequently, the resultant product was pulverized, rinsed, dried, and sieved to thereby prepare $Y_{(2-0.2-y-0.08)}Gd_{0.2}Ca_yO_3:Eu_{0.08}$ (wherein, in Chemical Formula 1, M=Ca, x=0.2, and z=0.08) red phosphors. The y values were varied between Examples 1 through 5, and the y values for each Example are shown in the following Table 1.

TABLE 1

|  | y |
| --- | --- |
| Example 1 | 0.005 |
| Example 2 | 0.01 |
| Example 3 | 0.05 |
| Example 4 | 0.1 |
| Example 5 | 0.5 |

Comparative Example 1

Yttrium oxide ($Y_2O_3$), gadolinium oxide ($Gd_2O_3$) and europium oxide ($Eu_2O_3$) were mixed according to chemical equivalent ratios, and mixed with 0.5 wt % of $AlF_3$ as a flux and baked at about 1400° C. in a reduction atmosphere for 2 hours 30 minutes. Subsequently, the resultant product was pulverized, rinsed, dried, and sieved to thereby prepare a $Y_{1.72}Gd_{0.2}O_3:Eu_{0.08}$ red phosphor.

Comparative Example 2

Yttrium oxide ($Y_2O_3$), gadolinium oxide ($Gd_2O_3$), calcium carbonate ($CaCO_3$), and europium oxide ($Eu_2O_3$) were mixed according to chemical equivalent ratios, and mixed with 0.5 wt % of $AlF_3$ as a flux and baked at about 1400° C. in a reduction atmosphere for 2 hours 30 minutes. Subsequently, the resultant product was pulverized, rinsed, dried, and sieved to thereby prepare a $Y_{0.72}Gd_{0.2}Ca_1O_3:Eu_{0.08}$ red phosphor.

Comparative Example 3

Yttrium oxide ($Y_2O_3$), barium oxide (BaO), calcium carbonate ($CaCO_3$), and europium oxide ($Eu_2O_3$) were mixed according to chemical equivalent ratios, and mixed with 0.5 wt % of $AlF_3$ as a flux and baked at about 1400° C. in a reduction atmosphere for 2 hours 30 minutes. Subsequently, the resultant product was pulverized, rinsed, dried, and sieved to thereby prepare a $Y_{0.87}BaCa_{0.05}O_3:Eu_{0.08}$ red phosphor.

Evaluation-1

Figure 2:
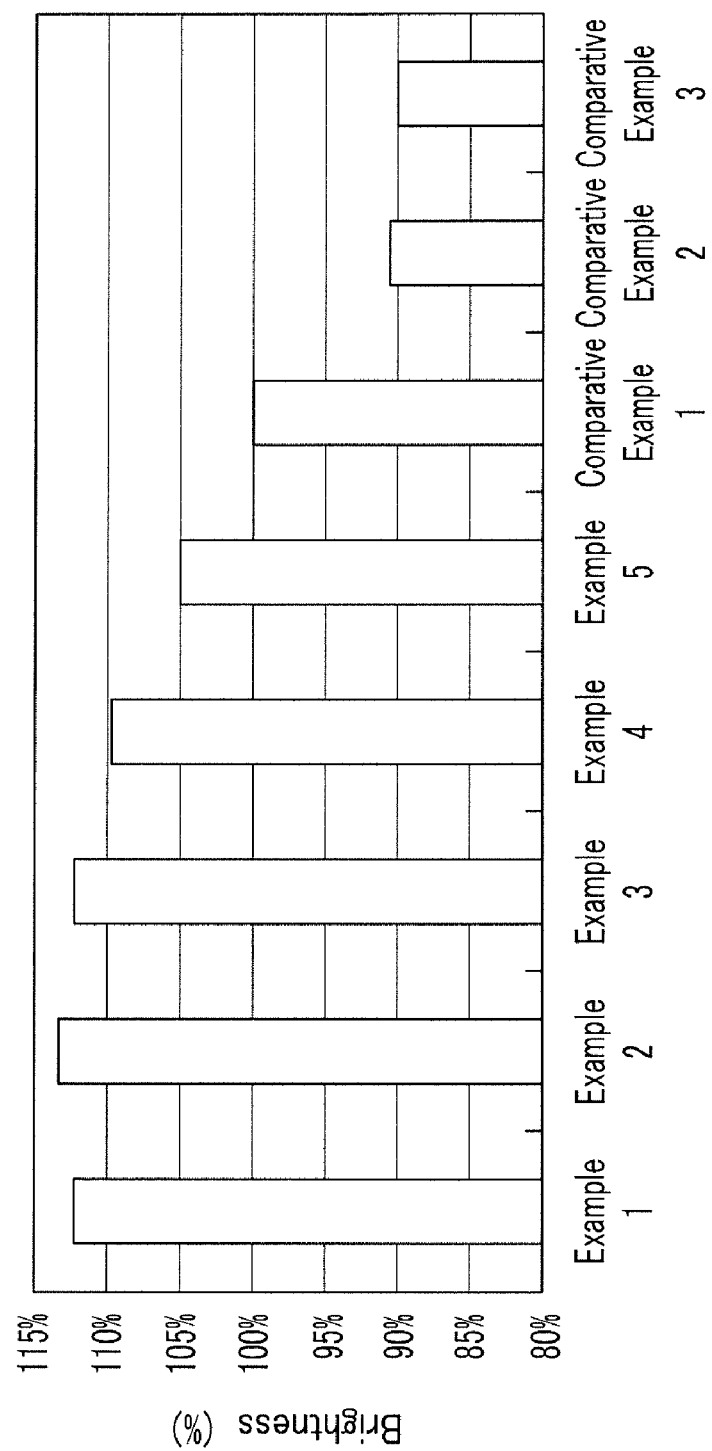
FIG. 2 is a graph comparing the brightness of the red phosphors prepared according to Examples 1 to 5 and Comparative Examples 1 to 3.

The brightness of the red phosphors prepared according to Examples 1 to 5 and Comparative Examples 1 to 3 was measured. The results are shown in FIG. 2. FIG. 2 is a graph comparing the brightness of the red phosphors prepared according to Examples 1 to 5 and Comparative Examples 1 to 3. The brightness of the red phosphors was evaluated using the brightness of the phosphor prepared according to Comparative Example 1 as a control (i.e., the brightness of the phosphor of Comparative Example 1 is represented by 100%).

As shown in FIG. 2, the red phosphors according to Examples 1 to 5 showed better brightness than the phosphor according to Comparative Example 1 (which did not include an alkaline-earth metal element). The red phosphors of Examples 1 to 5 also had increased brightness compared to the phosphors of Comparative Examples 2 and 3.

Evaluation-2

Figure 3:
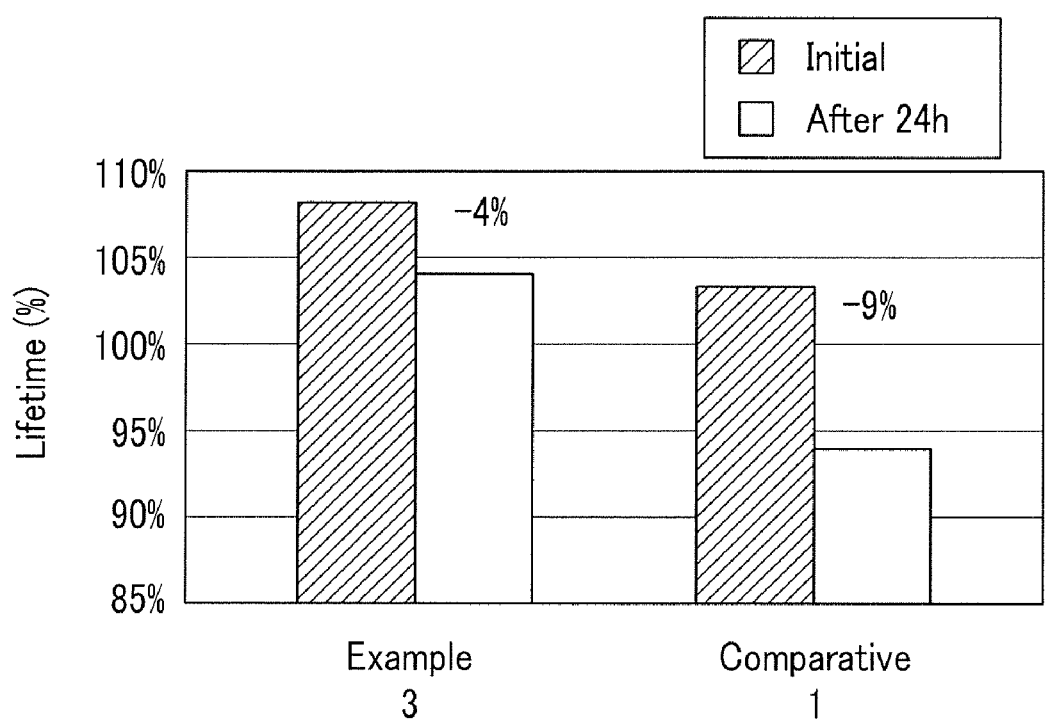
FIG. 3 is a graph comparing the lifetime characteristics of the red phosphors prepared according to Example 3 and Comparative Example 1.

The lifetime characteristics of the red phosphors prepared according to Example 3 and Comparative Example 1 were compared. The results are shown in FIG. 3. FIG. 3 is a graph comparing the lifetime characteristics of the red phosphors prepared according to Example 3 and Comparative Example 1.

As shown in FIG. 3, while the phosphor prepared according to Example 3 had a lifetime deterioration of about 4% after 24 hours relative to the initial lifetime, the phosphor prepared according to Comparative Example 1 had a lifetime deterioration of about 9% after 24 hours relative to the initial lifetime. These results indicate that the phosphor prepared according to Example 3 maintains better lifetime characteristics after use relative to the initial lifetime than the phosphor prepared according to Comparative Example 1.

Evaluation-3

Figure 4:
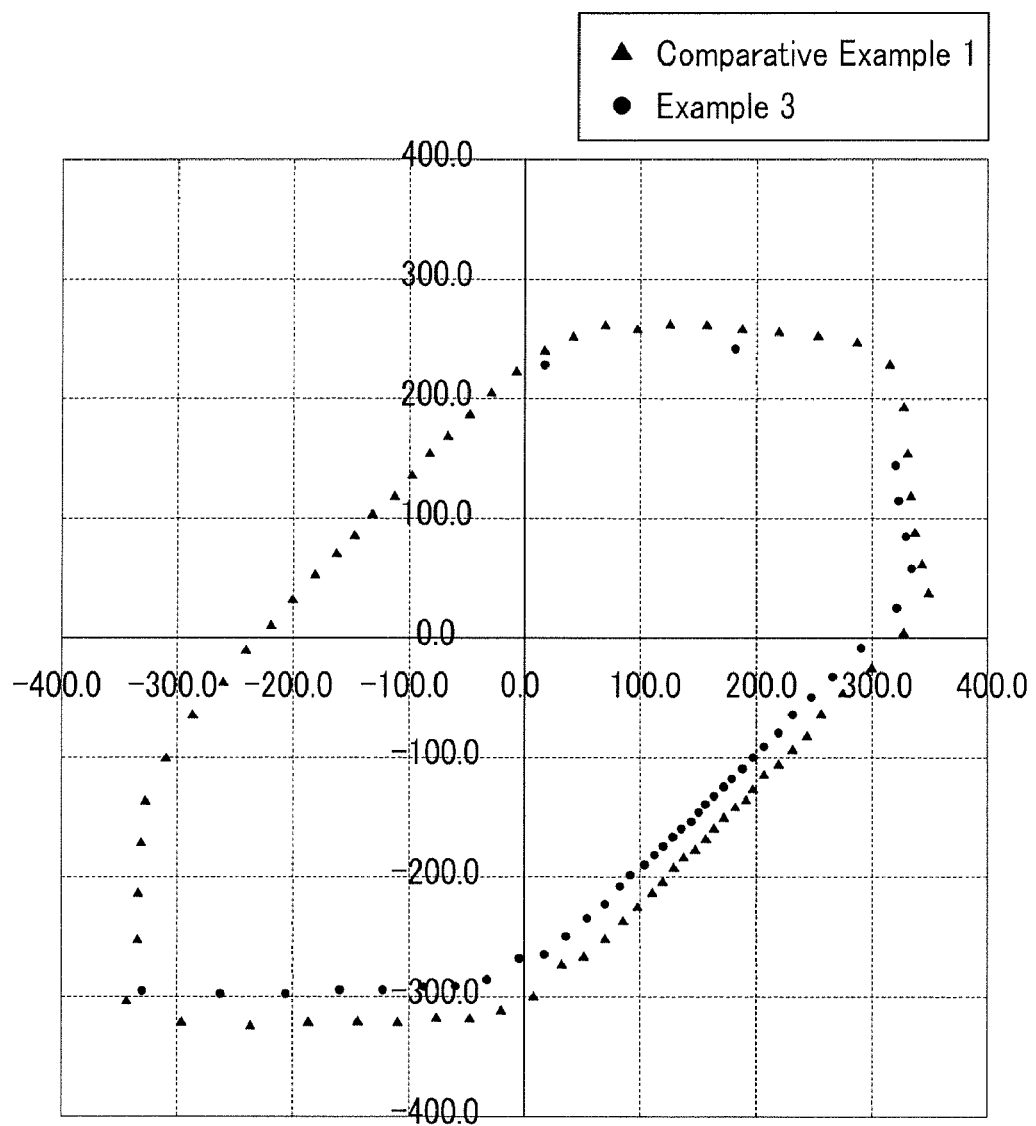
FIG. 4 is a graph comparing the discharge voltage characteristics of the red phosphors prepared according to Example 3 and Comparative Example 1.

The discharge voltage characteristics of the red phosphors prepared according to Example 3 and Comparative Example 1 were compared. The results are shown in FIG. 4. FIG. 4 is a graph comparing the discharge voltage characteristics of the red phosphors prepared according to Example 3 and Comparative Example 1.

Referring to FIG. 4, the red phosphor prepared according to Example 3 showed decreased discharge voltage by about 20 to about 30V compared to the red phosphor prepared according to Comparative Example 1.

While this disclosure has been presented in connection with certain exemplary embodiments, those of ordinary skill in the art will understand that certain modifications and changes to the described embodiments may be made without departing from the spirit and scope of the disclosure, as described in the appended claims.

What is claimed is:

1. A red phosphor comprising:
   yttrium (Y);
   gadolinium (Gd);
   an alkaline-earth metal element; and
   europium (Eu), wherein the red phosphor is represented by Chemical Formula 1:

$$Y_{(2-x-y-z)}Gd_xM_yO_3:Eu_z \quad \text{Chemical Formula 1}$$

wherein M is the alkaline-earth metal element, $0<x+y+z<2$, and $0<y<1$.

2. The red phosphor of claim 1, wherein $0.01 \leq x \leq 1.4$, $0.01 \leq y \leq 0.1$, and $0.05 \leq z \leq 0.1$.

3. The red phosphor of claim 1, wherein the alkaline-earth metal element is Ca, Sr, Ba, or a combination thereof.

4. A plasma display panel comprising:
   a red phosphor comprising yttrium (Y), gadolinium (Gd), an alkaline-earth metal element, and europium (Eu), wherein the red phosphor is represented by Chemical Formula 1:

$$Y_{(2-x-y-z)}Gd_xM_yO_3:Eu_z \quad \text{Chemical Formula 1}$$

wherein M is the alkaline-earth metal element, $0<x+y+z<2$, and $0<y<1$.

5. The plasma display panel (PDP) of claim 4, wherein $0.01 \leq x \leq 1.4$, $0.01 \leq y \leq 0.1$, and $0.05 \leq z \leq 0.1$.

6. The plasma display panel (PDP) of claim 4, wherein the alkaline-earth metal element is Ca, Sr, Ba, or a combination thereof.

* * * * *